Jan. 23, 1934.     C. L. GREGORY     1,944,230
COLOR FILTER
Filed April 4, 1931
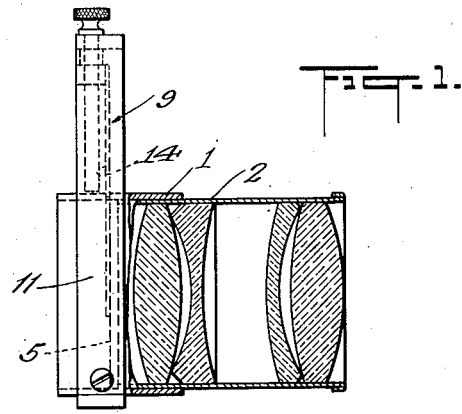
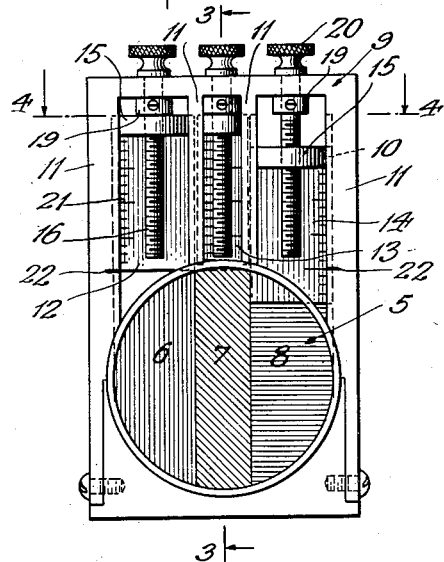
INVENTOR
Carl Louis Gregory
BY
Gifford, Scull & Burgess
ATTORNEYS.

Patented Jan. 23, 1934

1,944,230

UNITED STATES PATENT OFFICE 1,944,230

COLOR FILTER

Carl Louis Gregory, New Rochelle, N. Y., assignor to Kislyn Corporation, Englewood, N. J., a corporation of Delaware Application April 4, 1931. Serial No. 527,681

2 Claims. (Cl. 95—81.5)

This invention relates to a novel and improved form of color filter, the novel features of which will be best understood from the following description and the annexed drawing, in which is shown a selected embodiment of the invention, and in which:

Fig. 1 is a longitudinal sectional view through an objective having the screen applied thereto, the screen being shown mostly in elevation.

Fig. 2 is a view of the apparatus shown in Fig. 1 as viewed from the left of that figure.

Fig. 3 is a section on the line 3—3 of Fig. 2.

Fig. 4 is a section on the line 4—4 of Fig. 2.

In the art of color photography, it is known to use a color screen having a plurality of areas or zones of different colors, for the purpose of filtering the beam of light passing through the screen. This type of screen is used with various kinds of apparatus with which color photography is practiced, and the invention herein may be used with any such apparatus where found applicable. It is of particular utility, however, in connection with the practice of color photography according to the well-known Berthon process, this process using a film with a mutiplicity of lenticular elements thereon, as illustrated, for example, in the Berthon Patent No. 992,151.

The screen is shown herein as comprising a shell 1 adapted to fit over the end of an objective casing 2 within which are mounted the usual lenses, which may be of any suitable characteristics. The shell is provided with a plurality of circumferentially spaced slits 3, thereby forming tongues 4 having sufficient resiliency to hold the screen in place on the end of the objective casing.

The screen proper is shown at 5 and may consist of the three areas or zones 6, 7, and 8. These zones are arranged generally parallel to each other, the illustrative embodiment showing them as extending vertically and being three in number and colored red, green, and blue. This is the usual form of tri-color screen, although it is to be understood that the number of colors may be varied without departing from the scope of the invention.

Usually, the areas of the three zones are made approximately equal, so that an equal amount of light will pass through each section. The color values of the three zones, however, are not equal, and the film emulsion is not equally sensitive to all colors of the screen. An effort is made in manufacture to treat the emulsion to make it equally sensitive to the three colors, but this is rarely accomplished with the desired degree of perfection.

According to my invention, however, I provide means for balancing the color values of the screen so that they will compensate for unequal sensitivities of the film to different colors. For example, the film has a certain sensitivity to red, a certain sensitivity to green, and still another sensitivity to blue. These sensitivities for a certain film may be measured by known methods, and their relation to each other determined. The color values of the screen are then adjusted so that they are balanced in the proportion required to form a record giving the sensation of white.

The balancing referred to above may be accomplished by adjusting the areas of each of the zones, and for this purpose I mount on the shell 1 a frame 9, and on that frame I support a sectional diaphragm having one section for each of the zones 6, 7, and 8. Each section is mounted in guides, here shown as slots 10, in the frame, this frame being provided with a plurality of vertically extending legs 11 in which the guides may conveniently be formed. Between each two of the legs is mounted one of the sections of the diaphragm, each section being designated, respectively, 12, 13, and 14, and being disposed with adjacent edges substantially in contact so as to form a substantially continuous cover across the screen when lowered.

Each section is provided adjacent its top with an ear 15 in which is threaded a screw 16 held in the frame against longitudinal movement, but capable of rotation in the frame. For this purpose, the top of the frame is shown as having a horizontally extending portion 17 within which the unthreaded neck 18 of each screw is rotatably placed and held against longitudinal movement by a collar 19 beneath the portion 17 and by a knob 20 above the portion 17. Each knob 20 may be knurled as shown, so that the screw may be rotated. The edges of each section may be provided with graduations as indicated at 21 which cooperate with fixed marks 22 on the frame to measure the amount of movement of the sections.

From the above description, the operation of my invention will be understood, but it may be briefly reviewed as follows:

The sensitivities of the film to the different colors of the screen are first measured and their relation to each other determined. If the same relation exists between the color sensitivities as exists between the areas of the zones on the filter, then no adjustment is necessary, but if, as is usual, the same relation does not exist, then the sections of the diaphragm may be adjusted as found necessary to decrease the area of one or more zones so as to balance the relationship of these areas. For example, it is quite common to find that a film is more sensitive to blue light than it is to green and red. In that case, the area of the blue zone would be decreased by adjustment of the section 14 in some such manner as indicated in Fig. 2, so as to decrease the amount of light passing through that zone and consequently the amount of blue light passing through the screen.

While I have shown the invention above in connection with an objective, it is, of course, to be understood that it may be used in other locations in an optical system, and may be employed in any photostatic process where it is found suitable, either taking, printing, or projecting. Likewise, various changes in details may be made without departing from the scope of the invention, and, therefore, I do not intend to limit myself except by the scope of the appended claims.

I claim:

1. In a color photography optical apparatus, a color filter screen having a plurality of zones of different colors, a photographic lens system so associated with said screen that light may pass through both the screen and the system to a film, means for adjusting the relative color values of said zones, said means comprising a frame disposed adjacent said screen, means for holding said frame in fixed position relative to said lens system, a diaphragm formed in sections, with each section movable over one of said zones, guides on said frame in which said sections are slidably mounted, and an actuating device for each section adapted to move that section over one of said zones, whereby the relation between the areas of said zones may be adjusted to compensate for said unequal sensitivities without removing the screen.

2. In a color photography optical apparatus, a color filter screen having a plurality of zones of different colors, a photographic lens system so associated with said screen that light may pass through both the screen and the system to a film, means for adjusting the relative color values of said zones, said means comprising a frame disposed adjacent said screen, means for holding said frame in fixed position relative to said lens system, a diaphragm formed in sections, with each section movable over one of said zones, guides on said frame in which said sections are slidably mounted, an actuating device for each section adapted to move that section over one of said zones, whereby the relation between the areas of said zones may be adjusted to compensate for said unequal sensitivities without removing the screen, and means on the frame and sections for measuring the amount of movement of the respective sections.

CARL LOUIS GREGORY.